US005765218A

United States Patent [19]
Ozawa et al.

[11] Patent Number: 5,765,218
[45] Date of Patent: Jun. 9, 1998

[54] ADDRESS GENERATING CIRCUIT FOR GENERATING ADDRESSES SEPARATED BY A PRESCRIBED STEP VALUE IN CIRCULAR ADDRESSING

[75] Inventors: Yuji Ozawa, Setagaya-ku; Shigeshi Abiko, Tokyo, both of Japan; Frederic Boutaud, Roquefort les Pins, France

[73] Assignee: Texas Instruments Incorporated, Dallas, Tex.

[21] Appl. No.: 402,224

[22] Filed: Mar. 10, 1995

[30] Foreign Application Priority Data

Mar. 14, 1994 [JP] Japan .................. 6-042819

[51] Int. Cl.$^6$ .................................. G06F 12/02
[52] U.S. Cl. .................. 711/219; 711/217; 711/220
[58] Field of Search ............ 395/421.01, 421.07, 395/421.08, 421.09, 421.1

[56] References Cited

U.S. PATENT DOCUMENTS 4,202,035  5/1980  Lane ........................ 711/217
4,800,524  1/1989  Roesgen ..................... 711/219
4,908,748  3/1990  Pathak et al. ................ 711/220
4,916,658  4/1990  Lee et al. .................... 711/100
5,163,120  11/1992 Childers et al. .............. 395/800
5,355,462  10/1994 Rousseau et al. .............. 711/220
5,448,706  9/1995  Fleming et al. ............... 711/217

Primary Examiner—Glenn Gossage
Attorney, Agent, or Firm—Gerald E. Laws; William B. Kempler; Richard L. Donaldson

[57] ABSTRACT

An address generating circuit of simple configuration for circular addressing. A bit isolating circuit 304 extracts an index from an input address. When a step value input to an adder 302 is positive, an index generating circuit subtracts the sum of the index and step value from a block size of a memory region. Depending on the subtraction result, an output which is either the sum of the index and step value or the subtraction result is provided as a new index. When the step value is negative, the index and step value are added. Depending on the addition result, an output which is either the sum of the index, step value, and capacity of the memory region or the addition result is provided as a new index. A bit multiplexer 314 generates the next address from the new index and an address.

9 Claims, 6 Drawing Sheets

ADDRESS GENERATING CIRCUIT FOR GENERATING ADDRESSES SEPARATED BY A PRESCRIBED STEP VALUE IN CIRCULAR ADDRESSING

FIELD OF THE INVENTION

This invention pertains to an address generating circuit that generates spaced addresses for a prescribed region in a memory.

BACKGROUND OF THE INVENTION

When a calculation is carried out for correlating sampled signals or filtering by a digital signal processor (DSP), etc., it is necessary to access data stored in a prescribed memory region a number of times. The memory region in which the data is stored is called a circular block.

The region of the circular block is represented by an address for the top of the circular block (address within the circular block having the smallest numerical value) (top address) and a numerical value for the capacity of the circular block (block size). When the numerical value obtained by subtracting 1 (one) from the block size is added to the top address, the address for the bottom of the circular block (address having the largest numerical value) (bottom address) is obtained.

The access operation is performed with respect to the circular block for each step value. The value obtained by adding the step value, which may be positive or negative, to a default address, becomes the address to be accessed next. That is, the address as the next access subject (pointer) can be obtained by adding the step value to the default address.

In the following, an explanation will be given regarding the conventional method of address generation in the circular addressing, that is, access with respect to the circular block.

First of all, an explanation will be given for the case in which the step is positive and access is made from the top address to the bottom address. First, the step is added to the default address to derive the first numerical value. This first numerical value becomes the next address. On the other hand, to check whether this first numerical value is larger than the bottom address, the bottom address is subtracted from this first numerical value. But if the difference is $\geq 0$, the block size is subtracted from the first numerical value to derive a second numerical value. This second numerical value is taken as the next address to achieve circular addressing. When the difference is negative, the first numerical value is taken as the next address.

In the following, an explanation will be given for the case in which the step value is negative, and access is performed from the bottom address to the top address. As in the case in which the step value is positive, at first, the step value is added to a default address to derive the first numerical value. This first numerical value becomes the next address. On the other hand, to check whether this first numerical value is smaller than the top address, the first numerical value is subtracted from this top address. When the result of subtraction of the top address from the first numerical value is $\geq 0$, the first numerical value is taken as the next address in the circular addressing. But if the result of this subtraction operation is negative, the block size is added to the first numerical value to derive the second numerical value. This second numerical value is taken as the next address in the circular addressing.

By using the method, an address is generated for circular addressing from the top address to the bottom address or from the bottom address to the top address.

On the other hand, there are cases in which it is necessary to repeatedly execute a program stored in the prescribed memory region a prescribed number of times. When access is made to the prescribed memory region (block repeat access), the so-called block repeat addressing method is adopted for addressing. The block repeat addressing is explained below with reference to FIG. 11.

FIG. 11 is a diagram illustrating the configuration of conventional address generating circuit 9 in the block repeat addressing.

As shown in FIG. 11, address generating circuit 9 consists of program counter (PC) 900, comparators 902 and 916, register (END) 904, selector 906, register (START) 908, up counter 910, down counter 912, and block repeat count register (BRCR) 914.

First of all, before implementation of the block repeat operation, the bottom address (end address) of the program for repeated execution is set in register 904, the top address (front address) of the program is set in register 908, and the cycle repetition number is set as the initial value in register 914.

After the start of the block repeat access, an address is generated from program counter 900 for each period of operation. This address is fed to a memory (not shown in the figure) and up counter 910, and it is also output to comparator 902. In up counter 910, one is added (incremented) to the input address, and the result is output to selector 906.

In comparator 902, comparison is made between the address output from program counter 900 and the bottom address stored in register 904 to determine whether they are equal to each other. When comparator 902 determines that the address of program counter 900 and the bottom address are not identical to each other, PC=END signal enters the inactive state (low level), and selector 906 selects the input I0 side, and output is made to program counter 900. That is, when the address in the period of operation is not equal to the bottom address, the address of the period of operation is incremented, and the result is output from program counter 900 as the address of the next period of operation.

When comparator 902 determines that the address output from program counter 900 is equal to the bottom address, PC=END signal enters the active state (high level), selector 906 selects the input I1 side, and output is made to program counter 900. That is, when the address reaches the bottom address, the top address is output from program counter 900 as the address of the next period of operation.

In addition, when PC=END signal enters the active state, in register 914, the cycle repetition number is subtracted (decremented) by one by means of down counter 912, the decremented value is stored, and it is output to comparator 916. That is, each time one series of generated addresses is completed for executing the total region of the block repeat program in the direction from the top address to the bottom address, the cycle repetition number stored in register 914 is decremented.

After the operation is repeated a prescribed number of cycles, the value in register 914 becomes zero. Comparator 916 compares the cycle repetition number stored in register 914 with zero. If they are equal to each other, the inhibiting signal enters the active state (high level). As the inhibiting signal becomes active, address generating circuit 9 completes the block repeat access operation.

SUMMARY OF THE INVENTION

As explained above, in the conventional method for generating addresses in the circular addressing, three operations (addition or subtraction) are performed to generate the next address. Consequently, three operation units are needed for the address generating circuit in this case. More specifically, the conventional address generating circuit requires three adders. Since adders are relatively large hardware units with respect to the circuit scale, the conventional address generating circuit containing three adders with a large circuit scale occupies a large area on the semiconductor chip. This is a problem.

Also, for calculating address generation, it is necessary to store the step, top address, and bottom address. This is a disadvantage.

Also, when the conventional address generating circuit for block repeat addressing is used in a central processing unit (CPU) using a multistage pipeline configuration, it is necessary to apply a restriction on the size of the block repeat depending on the number of stages of the pipeline. This is a problem.

That is, at the point in time at which the command of the bottom address is fetched to the pipeline by means of the block repeat addressing by the CPU, the cycle repetition number of the address generating circuit is decremented. Consequently, at this point in time, interruption with respect to the CPU is issued. When it returns from the interruption processing, although there is command that is not implemented (the command of the bottom address), the content of the register storing the cycle repetition number has already decremented, and it indicates completion of the program series of the preceding cycle. Consequently, it is necessary to prohibit interruption with respect to the command before the bottom address by the number of stages of the pipeline. Accompanying this, it is necessary to restrict the size of the block repeat (the number obtained by adding one to the difference between the bottom address and the top address) so that it is larger than the numerical value obtained by adding one to the number of stages of the pipeline.

The purpose of the address generating circuit of this invention is to solve the problems of the conventional technology. The first purpose of this invention is to provide an address generating circuit characterized by the fact that the operation processing for generating addresses can be simplified for address generation in circular addressing, and that the address generating circuit for circular addressing has a simple circuit configuration.

The second purpose of this invention is to provide an address generating circuit for block repeat addressing characterized by the fact that it is free of the various restrictions on the program formation, such as the restriction on the size of the block repeat due to the number of stages of the pipeline of the CPU, prohibiting interruption with respect to the command near the bottom address.

To realize the first purpose, this invention provides an address generating circuit having an address generating circuit which generates an address repeatedly every step value with respect to a prescribed memory region. The address generating circuit has a circuit for extracting the least significant bit side of the default address corresponding to the capacity of the memory region. When the step value is positive, another circuit subtracts the sum of the least significant bit side and the step value from the capacity value of the memory region. When the difference is ≧0, the difference is output as an index. When the difference is <0, the sum of the least significant bit side and the step value is output as an index. When the step value is negative, the least significant bit side is added to the step value. If the result is ≧0, the result is output as an index. When the result is <0, the sum of the least significant bit side, the step value, and the capacity of the memory region is output as an index. Next, a combining circuit generates the next address from the index and the bit portion other than the least significant bit side of the default address.

To realize the second purpose, an address generating circuit is provided having a first memory for storing the first address and a second memory for storing the first address or a second address of a value larger than the first address. An adder circuit adds a prescribed value to an input numerical value and outputs the result. An address output circuit selects either the first address or the value output from the adder and outputs it to the adder. A comparator compares the second address and the value output from the address output circuit, and outputs a coincidence signal when the values are identical. A third memory stores a prescribed numerical value which a subtractor that subtracts from the input numerical value and outputs to the third memory and a control means with the following function: When the coincidence signal is output, corresponding to the numerical value output from the subtractor, a control circuit ensures that the address output circuit outputs the first address and the subtractor carries out subtraction with respect to the numerical value of the third memory.

In the case in which access is performed repeatedly for each step value with respect to the memory region with a prescribed capacity, that is, circular addressing, the address is changed for the least significant bit side alone corresponding to the memory region. In this case, the least significant bit side is extracted from the default address.

When the step value is positive, access with respect to the memory region is performed from the top address to the bottom address. Consequently, subtraction is carried out between (i) the sum of the least significant bit side and the step value and (ii) the capacity of the memory region. Whether the sum of the least significant bit side and the step value is within the range of the memory region is then determined. If the subtraction result is ≧0, it indicates that the sum of the least significant bit side and the step value is outside the memory region. If so, the result of the subtraction of the sum of the least significant bit side and the step value and the capacity of the memory region is output as an index. On the contrary, if the subtraction result is negative, it indicates that the sum of the least significant bit side and the aforementioned step value is within the range of the memory region. Consequently, the sum of the least significant bit side and the step value is output as an index.

When the step value is negative, it indicates that access to the memory region is performed from the bottom address to the top address. Consequently, addition of the least significant bit side and the step value is performed, and whether the sum of the least significant bit side and the step value is within the range of the memory region is determined. When the sum is ≧0, the sum of the least significant bit side and the step value is within the range of the memory region and the sum is output as an index. But if the sum is negative, the least significant bit side plus the step value is outside the range of the memory region. Consequently, the sum of the least significant bit side, the step value, and the capacity of the memory region is output as an index.

From the bit portion other than the aforementioned least significant bit side of the default address and the aforementioned generated index, the next address to be accessed is generated.

In the case of repeated execution of the program in the prescribed memory region, that is, in the block repeat processing, when the bottom address of the aforementioned memory region is reached, the cycle repetition number is decremented, and, at the same time, the top address of the aforementioned memory region is set as the next address. When the block repeat processing is performed under the pipeline control, if interruption takes place, the decrement operation of the cycle repetition number may not be performed correctly in some cases.

In the address generating circuit of this invention, as execution of the command of the bottom address of the aforementioned memory region is confirmed, the aforementioned decrement processing for the aforementioned cycle repetition number is performed. As the decrement processing of the aforementioned cycle repetition number is confirmed, the aforementioned top address is set as the next address.

DETAILED DESCRIPTION OF THE PREFERRED EMBODIMENTS

Figure 9:
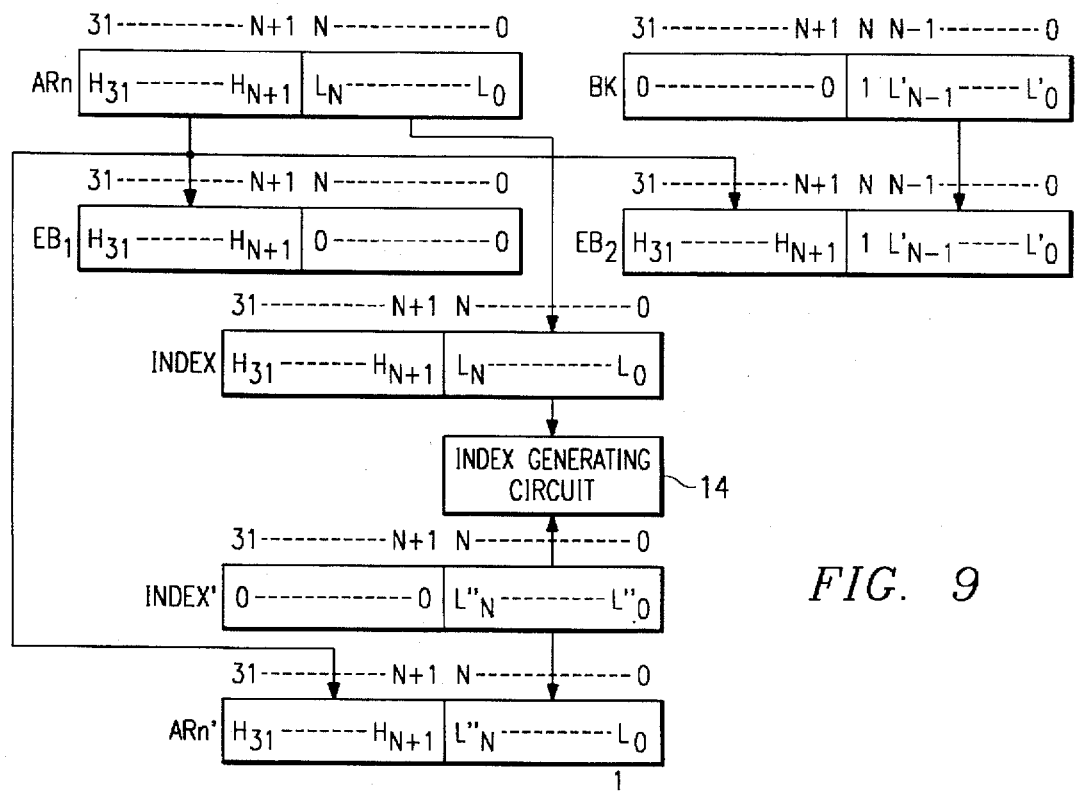
FIG. 9 is a diagram schematically of the address generation in the circular addressing.

A mechanism for generating an address in circular addressing according to this invention can be explained schematically with reference to FIG. 9. In the conventional address generation process, the next address is derived directly. According to this invention, the next address is derived relatively. In the following explanation, the address and block size are binary values with a 32-bit configuration. In FIG. 9, ARn represents the current address, BK represents the block size, EB1 represents the top address of the circular block, EB2 represents the bottom address of the circular block, Index represents the index in a default address stored in AR(n), Index' represents the index in the next address, ARn' represents the next address in the circular addressing, and 14 represents the index generating circuit.

(1) The most significant bit where 1 is present in the block size BK is detected. In FIG. 9, bit N represents the most significant bit where 1 is present.

(2) Then, as the value of bit 31 to bit (N+1) of default address ARn and bit N to bit 0 are all zero, the value of bit 31 to bit 0 of top address EB1 is derived; from the value of bit 31 to bit (N+1) of default address ARn and the value of bit N to bit 0 of block size BK, the value of bit 31 to bit 0 of bottom address EB2 is derived.

(3) Then, in circular addressing, for each step value, increment or decrement is performed to derive index Index. When bit 31 to bit (N+1) are all zero, from the value of bit N to bit 0 of default address ARn, bit 31 to bit 0 of index Index is derived.

(4) Then, the step value is added to index Index to derive the new index Index'. In this case, when the value obtained by adding the step value to index Index becomes block size BK or larger, from the sum, the value obtained by subtracting the block size BK from the sum is taken as the new index Index'. When the aforementioned sum becomes negative, the value obtained by adding block size BK to the sum is taken as the new index Index'.

(5) Then, from the value of bit 31 to bit (N+1) of address ARn and the value of new index Index' (bit N to bit 0), the value of bit 31 to bit 0 of the new address ARn' is derived.

Then the steps of said (3)–(5) are repeated, and address generation in circular addressing is realized. In addition, said Index' is formed by means of index formation logic 14.

In the following, the address generation in circular addressing will be explained in detail with reference to FIG. 10.

Figure 10:
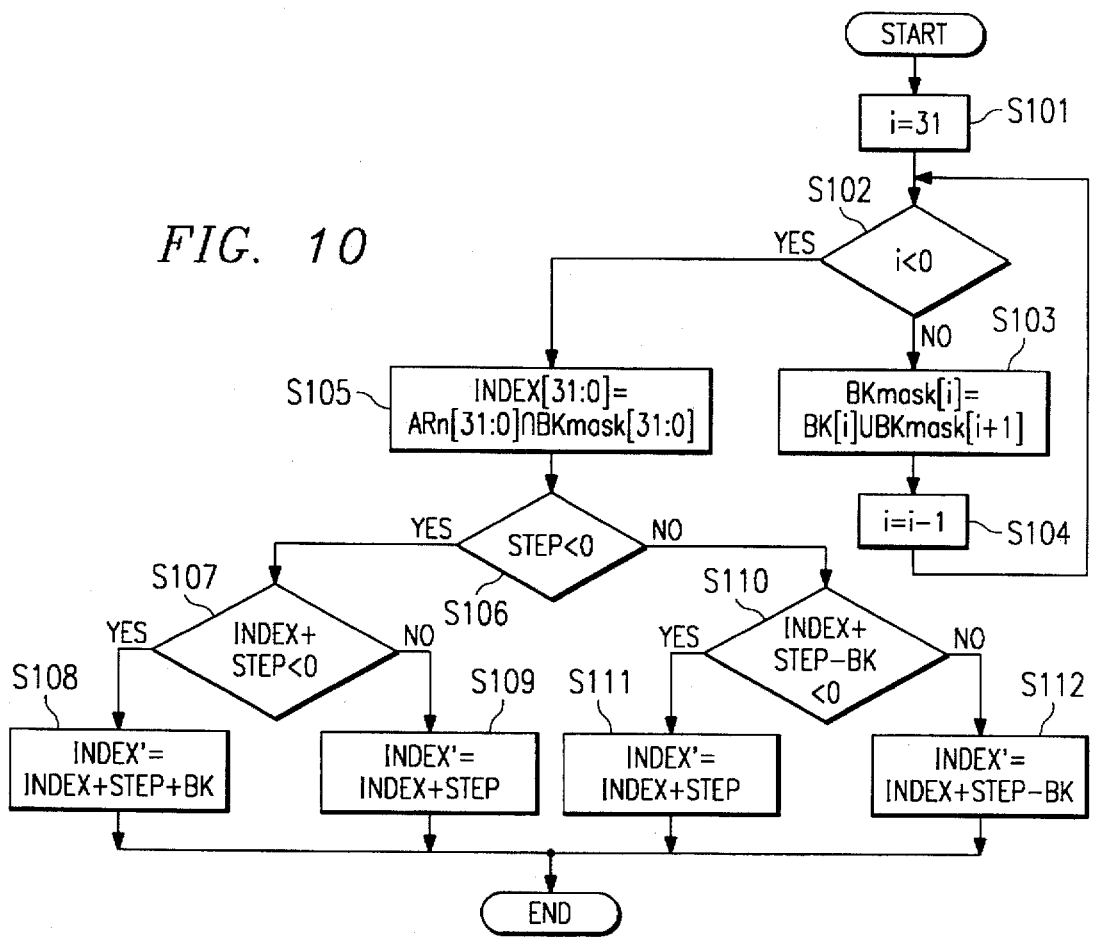
FIG. 10 is a flow chart of an index generation process.

FIG. 10 is a flow chart illustrating the index generation process. In FIG. 10, i represents a variable for the operation; BKmask[a:b] represents the value of bit a to bit b of numerical value BKmask for the operation; BKmask[c] represents the value of bit c of BKmask; BK[a:b] represents the value of bit a to bit b of the block size; BK[c] represents the value of bit c of the block size; ARn[a:b] represents the value of bit a to bit b of the address (pointer); Index represents the value of the index; Step represents the numerical value added to or subtracted from the index; and Index' represents the index newly generated in the index generation process.

In processing step S101, 31 is substituted into i.

In processing step S102, whether the value of i is negative is determined. If the value of i is 0 or larger, it goes to processing step S103. When the value of i is negative, it goes to processing step S105.

In processing step S103, the logical sum of the value of BK[i] and the value of BKmask[i+1] is calculated. The result is substituted into BKmask[i]. In this case, when i=31, BK[31] is substituted into BKmask[31].

In processing step S104, one is subtracted from i (i is decremented).

By means of this series of processing, the most significant bit where 1 is present is detected. As shown in FIG. 9, when bit N of block size BK is the most significant bit, the values of bit 31 to bit (N+1) of BKmask are all zero, while the values of bit N to bit 0 are all 1.

In processing step S105, the logical product of the value of ARn[31:0] and the value of BKmask[31:0] is calculated, and the result is substituted into Index. In the case shown in FIG. 9, values of bit 31 to bit (N+1) of Index are all zero, and Index[N:0] becomes a value equal to ARn[N:0].

In processing step S106, whether the value of Step is negative is determined. If the value of Step is negative, that is, when circular addressing is performed in the direction from the bottom address to the top address, it goes to processing step S107. When the value of Step is 0 or larger, that is, when circular addressing is performed in the direction from the top address to the bottom address, it goes to processing step S110.

In processing step S107, whether the sum of the value of Index and the value of Step is negative is determined. When the sum of the value of Index and the value of Step is negative, that is, when the value of the next address is outside the range between the top address and the bottom address, it goes to processing step S108. When the sum of the value of Index and the value of Step is 0 or larger, that is, when the value of the next address is within the range between the top address and the bottom address, it goes to S109.

In processing step S108, addition is carried out for the value of Index, the value of Step, and the value of BK, forming new Index'.

In processing step S109, addition is carried out for the value of Index and the value of Step, forming new Index'.

In processing step S110, subtraction is carried out for the sum of the value of Index and the value of Step, and the value of BK. Whether the result of operation is negative is determined. If the aforementioned result of calculation is negative, that is, when the value of the next address is within the range between the top address and the bottom address, it goes to processing step S111. When the result of the aforementioned calculation is 0 or less, that is, when the value of the next address is outside the range between the top address and the bottom address, it goes to processing step S112.

In processing step 111 S111, addition is carried out for the value of Index and the value of Step, forming new Index'.

In processing step 112 S112, subtraction is carried out for the sum of the value of Index and the value of Step, and the value of BK, forming the new Index'.

By means of the aforementioned series of processing steps, new index Index' is generated. As shown in FIG. 9, from the values of bit 31 to bit (N+1) of address ARn and the values of bit N to bit 0 of new index Index', the values of bit 31 to bit 0 of the new address ARn' are generated.

After generation of BKmask, the index is formed by implementing processing after S105.

In the following, address generating circuit 30 for circular addressing in this invention will be explained with reference to FIG. 1. There are 32 bits for each calculating operation unit in this application embodiment. The negative number is represented by means of two's complement.

Figure 1:
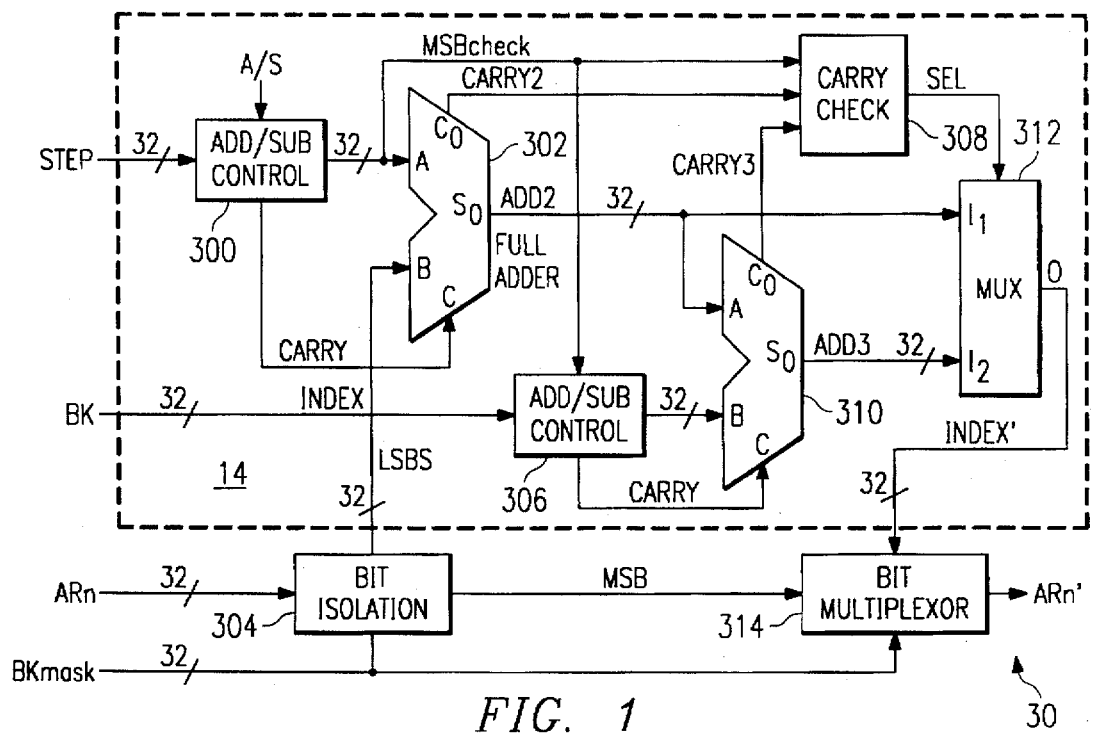
FIG. 1 is a diagram of an address generating circuit according to a first embodiment of the invention.

FIG. 1 is a diagram illustrating the configuration of address generating circuit 30 in the first application embodiment of this invention. In addition/subtraction control circuit 300, according to addition/subtraction control signal (A/S), it enters either the first operation mode or the second operation mode. In the first operation mode with addition/ subtraction control signal (A/S) being the addition command, the step input to input terminal Step is directly output to the input terminal A of adder 302. In this case, no carry is output to input terminal C of adder 302, and the value is zero. On the other hand, in the second operation mode with addition/subtraction control signal (A/S) being the subtraction command, the various bits of the step input to input terminal Step are inverted and the value is calculated for output to input terminal A of adder 302, and, at the same time, carry 1 is output to input terminal C of adder 302. Also, the two signals output to input terminal A and input terminal C of adder 302 form the step value.

As can be seen from the aforementioned explanation, when the sign of the step input to input terminal Step is changed in addition/subtraction circuit 300, the change is performed in the form of two's complement.

In addition/subtraction control circuit 306, according to the value of the most significant bit (MSB) of the value of the step output to input terminal A of adder 302, it enters the first operation mode or the second operation mode. When said MSB is 0, that is, when the step value is positive, in other words, when the circular addressing is performed in the direction from the top address to the bottom address of the circular block, it enters the second operation mode, the various bits of the block size input from input terminal BK are inverted, and the calculated numerical value is output to input terminal B of adder 310, and, at the same time, carry 1 is output to input terminal C of adder 310. On the other hand, when said MSB is 1, in other words, when the step value is negative, in other words, when circular addressing is performed from the bottom address to the top address, it enters the first operation mode, and the block size input from input terminal BK is directly output to input terminal of adder 310. Also, in this case, no carry is output to output terminal C of adder 310, and the value is 0.

In bit isolating circuit 304, based on BKmask, the address (pointer) input from input terminal ARn is separated to form a most significant bit portion and a least significant bit portion, wherein the point of separation is the bit position of the most significant 1 in a block size value, as indicated by Bkmask, and illustrated in FIGS. 9 and 10. The most significant bit portion (H31–Hn+1) and the least significant bit portion (Ln—L0)of ARn are output to bit multiplex circuit 314 and input terminal B of adder 302, respectively. In addition, as shown in FIG. 10, BKmask is the numerical value generated in processing steps 101–104, with all of the values of bit 31 to bit (N+1) at logical, and with all of the values of bit N to bit 0 at logical one. For the data output to input terminal B of adder 302, all of the values of bit 31 to bit (N+1) are zero, the values of bit N to bit 0 are identical to the values of bit N to bit 0 of the address input to bit isolating circuit 304, respectively, and the data output to input terminal B of adder 302 is equivalent to Index, which is explained in FIG. 10. On the other hand, for the data output to bit multiplex circuit 314, the values of bit 31 to bit (N+1) are identical to the values of bit 31 to bit (N+1) of the address input to bit isolating circuit 304, respectively.

Adder 302 performs the total addition operation for the index and step values input to input terminals A, B, and C. It outputs the result of the total addition operation (signal ADD2) to input terminal A of adder 310 and input terminal I1 of multiplexer 312, and it outputs the carry signal (Carry2) to carry checking circuit 308.

Adder 310 performs the total addition operation for signal ADD2, block size with all bits inverted or block size without inversion, and carry signal (1 or 0) input to input terminals A, B, and C, respectively. It outputs the result of the total addition operation (signal ADD3) to input terminal A of adder 310 and input terminal I2 of multiplexer 312, and it outputs the carry signal (Carry3) to carry checking circuit 308.

In multiplexer 312, according to control signal SEL output from carry checking circuit 308, one of signals ADD2 and ADD3 input to input terminals I1 and I2 is selected, and is output to bit multiplexer 314 as the new index (Index').

In bit multiplexer 314, multiplexing is performed for the more-significant-bit side of the data output from bit isolating circuit 304 and the least significant bit side of the new index output from multiplexer 312 based on BKmask. The multiplexed data is output as the new address from output terminal ARn'. The values of bit 31 to bit (N+1) of the new address are equal to the values of bit 31 to bit (N+1) of the address input to input terminal ARn, and the values of bit N to bit 0 of the new address are identical to the values of bit N to bit 0 of the new index output from multiplexer 312.

Carry checking circuit 308 outputs control signal SEL to multiplexer 312 corresponding to the most significant bit (MSB) of the step value output to input terminal A of adder 302, the carry signal (Carry2) of adder 302, and the carry signal (Carry3) of adder 310. When said MSB is 1, and the step value is negative, that is, when the circular addressing operation is performed in the direction from the bottom address to the top address, the carry signal of adder 302 alone is monitored, and the carry is output, that is, control is performed appropriately to ensure that when the carry signal (Carry2) is 1, multiplexer 312 selects signal ADD2, and no carry is output; and when the carry signal (Carry2) is 0, multiplexer 312 selects signal ADD3. On the other hand, when said MSB is 0, and the step value is positive, that is, when the circular addressing operation is performed in the direction from the top address to the bottom address, the carry signals of adders 302 and 310 are monitored, and control is performed appropriately to ensure that when carry is output from one adder, multiplexer 312 selects signal ADD3, while when no carry is output from both adders, multiplexer 312 selects signal ADD2.

In the following, an explanation will be given regarding the operation of address generating circuit 30 in the case in which the step value output to adder 302 is positive, and the circular addressing operation is performed in the direction from the top address to the bottom address. Addition/subtraction control circuits 300 and 306, adders 302 and 310, multiplexer 312 and carry checking circuit 308 correspond to index generating circuit 14 in FIG. 9.

Addition/subtraction control circuit 300 outputs a positive step value to adder 302. In this case, as MSB of the step value output to input terminal A of adder 302 becomes zero, carry checking circuit 308 monitors the carry signals of both adder 302 and adder 310; addition/subtraction control circuit 306 inverts all of the bits of the block size input to it, and outputs the result to adder 310, and outputs the carry to adder 310.

Adder 302 performs total addition operation for the index and the step value. Adder 310 performs the total addition operation for signal ADD2, the signal obtained by inverting all of the bits of the block size, and the carry signal, that is, it performs the subtraction operation for signal ADD2 and the block size. That is, processing S110 is performed by means of adders 302 and 310, and whether the result of subtraction between the sum of the index and step value and the block size is negative is determined.

Then, when the result of subtraction of the sum of the index and step value and the block size in other words, subtraction of the block size from the sum of the index and step value is negative, that is, when no carry-out signal is output from both adder 302 and adder 310, multiplexer 312 selects signal ADD2 obtained by adding the step value to the index, that is, the value obtained by adding the step value to the value of bit N to bit 0 of the default address, and outputs the result to bit multiplexer 314. On the other hand, when the result of subtraction of the sum of the index and step value and the block size is 0 or larger, that is, when a carry signal is output from one of adders 302 and 310, multiplexer 312 selects signal ADD3, that is, the result of subtraction of the sum of the index and step value and the block size, and outputs it to bit multiplexer 314.

In bit multiplexer 314, the value of bit 31 to bit (N+1) of the data output from bit isolating circuit 304, that is, the value of bit 31 to bit (N+1) of the default address, and the value of bit N to bit 0 of the new index output from multiplexer 312 are combined, and the result is output as the new address.

By means of the aforementioned series of operations, it is possible to realize the address generation in the circular addressing operation in the direction from the top address to the bottom address.

In the following, an explanation will be given regarding the operation of address generating circuit 30 in the case in which the step value output to adder 302 is negative, and the circular addressing operation is performed in the direction from the bottom address to the top address.

Addition/subtraction control circuit 300 outputs a negative step value to adder 302. In this case, as MSB of the step value output to input terminal A of adder 302 is 1, carry checking circuit 308 monitors the carry signal of adder 302 alone, and addition/subtraction control circuit 306 outputs the block size in its original form to adder 310. In this case, no carry is output to adder 310.

Adder 302 performs the total addition operation for the index and the negative step value. That is, adder 302 performs processing step S107 shown in FIG. 10. Whether the sum of the index and step value is negative is then determined. Also, adder 310 performs the total less significant bit side addition operation of signal ADD2 and the block size.

Then, when the sum of the index and step value is negative, that is, when no carry signal is output from adder 302, multiplexer 312 selects signal ADD3, the sum of the index, step value, and block size, and outputs it to bit multiplexer 314. On the other hand, when the sum of the index and step value is 0 or positive, that is, when a carry signal is output from adder 302, multiplexer 312 selects the value obtained by adding the step value to signal ADD2, the sum of the index and step value, that is the value of bit N to bit 0 of the default address, and outputs the value to bit multiplexer 314.

In bit multiplexer 314, the value of bit 31 to bit (N+1) of the data output from bit isolating circuit 304, that is, the value of bit 31 to bit (N+1) of the default address, and the value of bit N to bit 0 of the new index output from multiplexer 312 are combined, and the result is output as the new address.

By means of the aforementioned series of operations, the address generation can be realized in the circular addressing operation in the direction from the bottom address to the top address.

In the following, an explanation will be given regarding address generating circuit 40 using the circular addressing of this invention with reference to FIG. 2. There are 32 bits in the various calculation operation units in this application embodiment.

Figure 2:
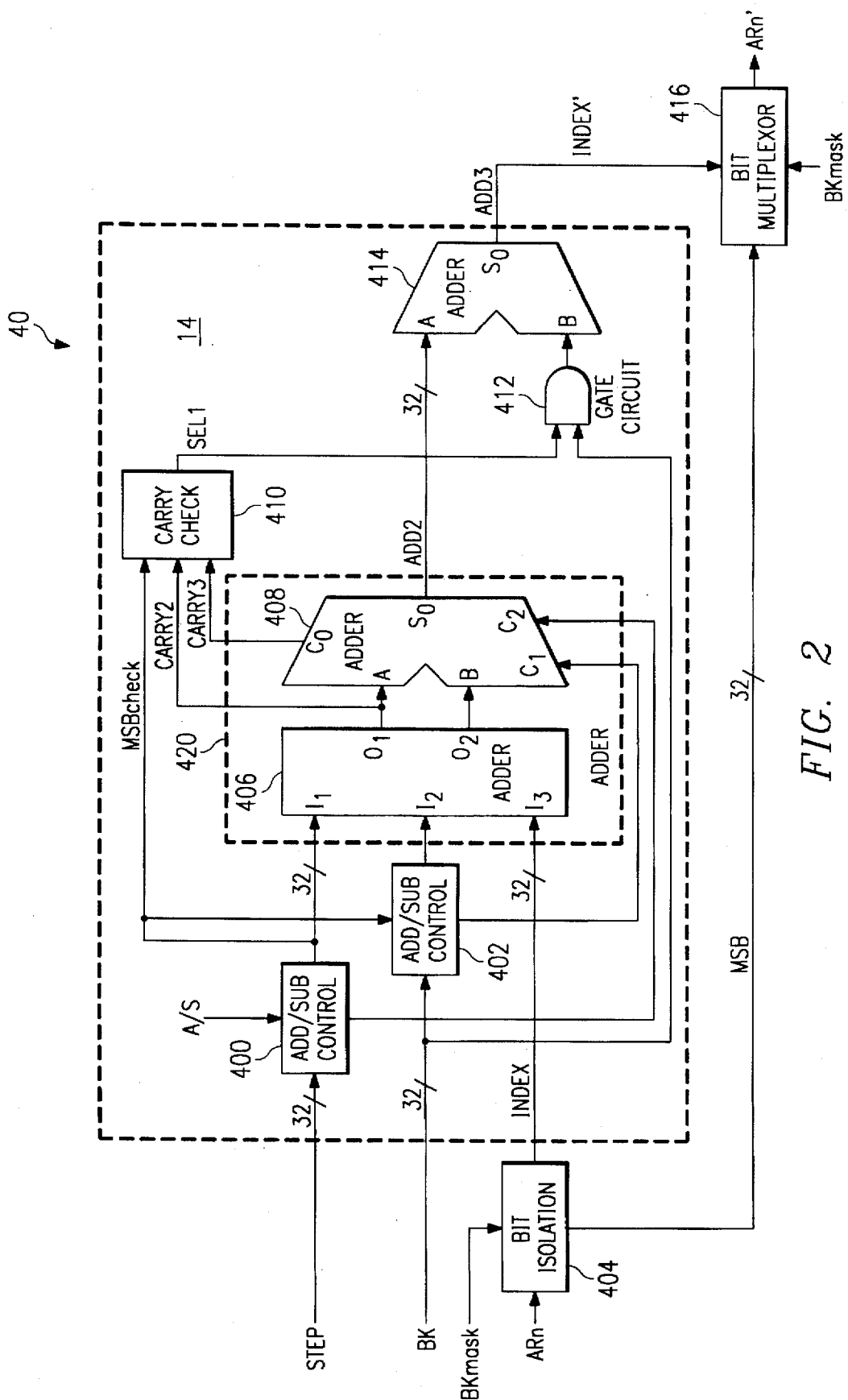
FIG. 2 is a diagram of an address generating circuit according to a second embodiment of this invention.

FIG. 2 is a diagram illustrating the configuration of address generating circuit 40 in the second application embodiment of this invention. Addition/subtraction control circuit 400 has the same function as that of addition/subtraction control circuit 300 shown in FIG. 1, and it enters the first operation mode or second operation mode according to addition/subtraction control signal (A/S). In the first operation mode with addition/subtraction control signal (A/S) of addition command, the step input to input terminal Step is directly output to input terminal I1 of partial adder 406. Also, in this case, no carry is output to input terminal C1 of partial adder 408. On the other hand, in the second operation mode with addition/subtraction control signal (A/S) of subtraction command, the various bits of the step input to input terminal Step are inverted, and the numerical value calculated in this way is output to input terminal I1 of partial adder 406, and, at the same time, a carry is output to input terminal C1 of partial adder 408. Also, the step value is made of the signal output to input terminal I1 of partial adder 406 and the signal output to input terminal C1 of partial adder 408.

Addition/subtraction control circuit 402 is controlled by the most significant bit (MSB) of the step value output to input terminal I1 of partial adder 406. When said MSB is 0, and circular addressing is performed in the direction from the top address to the bottom address of the circular block, the various bits of the block size input from input terminal BK are inverted, and the calculated numerical value is output to input terminal I2 of partial adder 406, and, at the same time, the carry is output to input terminal C2 of partial adder 408. On the other hand, when said MSB is 1, and circular addressing is performed in the direction from the bottom address to the top address of the circular block, 0 is output to input terminal I2 of partial adder 406, and no carry is output to input terminal C2 of partial adder 408.

Depending on the control signal (SEL1) output from carry checking circuit 410, gate circuit 412 selects whether to output 0 to input terminal B of adder 414 or to output the block size input to input terminal BK to input terminal B of adder 414.

Bit isolating circuit 404 has the same function as that of bit isolating circuit 304 shown in FIG. 1. Based on BKmask, the address input from input terminal ARn is divided into the most significant bit side and the least significant bit side, which are output to bit multiplexer 416 and input terminal I3 of partial adder 406.

Bit multiplexer 416 has the same function as that of bit multiplexer 314 shown in FIG. 1. Based on BKmask, multiplexing is performed for the most significant bit side of the data output from bit isolating circuit 404 and the least significant bit side of the data (signal ADD3) output from adder 414. The multiplexed data is output from output terminal ARn' as the new address.

The same data format as that explained in FIG. 1 is adopted for BKmask, the data output to input terminal I3 of partial adder 406, the data output to bit multiplexer 416 from bit isolating circuit 404, the data output from adder circuit 414, and the data output from bit multiplexer 416.

The data output to input terminal I3 of partial adder 406 is Index, and the data output from adder 414 is Index'.

Figure 3:
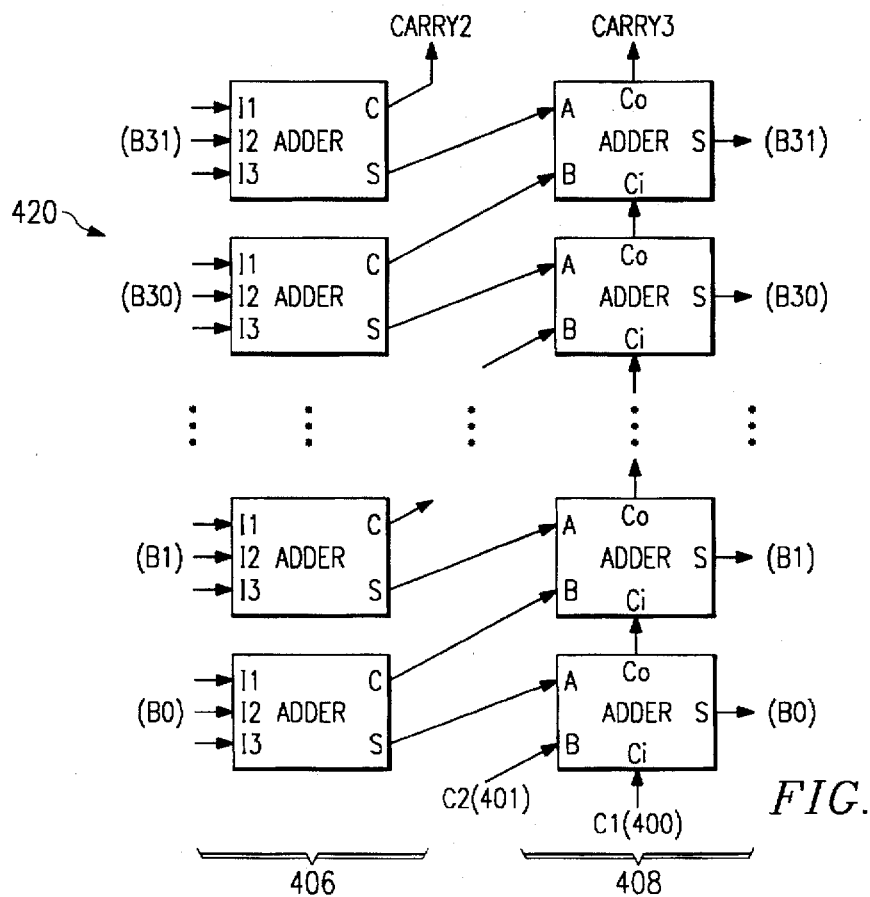
FIG. 3 is a diagram of a main portion of a three-input total adder made of two partial adders.

Partial adder 406 and partial adder 408 form three-input total adder 420. The configuration of this total adder 420 is shown in FIG. 3. This total adder 420 performs total addition operation for the step value, the block size with all bits inverted or 0, the index, and carry signal C2 input to input terminals I1, I2, I3, C1, and C2, respectively. The result of the total addition (signal ADD2) is output to input terminal A of adder 414, and two carry signals (Carry2, Carry3) are output to carry checking circuit 410.

Adder 414 performs addition for signal ADD2 and the output signal of gate circuit 412, input to input terminals A and B, respectively, and the result of the addition operation (signal ADD3) is output as the new index (Index') to bit multiplexer 416.

In carry checking circuit 410, corresponding to the most significant bit (MSB) output to total adder 420 and the two carry signals output by total adder 420, a control signal (SEL1) is output to gate circuit 412. When said MSB is 1, that is, when the circular addressing is performed in the direction from the bottom address to the top address, the two carry signals (Carry2 and Carry3) are monitored, and the carry is output. That is, control is made appropriately to ensure that when one of the carry signals is 1, 0 is output from gate circuit 412, and no carry is output, and that when the two carry signals are both 0, gate circuit 412 outputs the block size. On the other hand, when said MSB is 0, that is, when the circular addressing is performed in the direction from the top address to the bottom address, the two carry signals (Carry2 and Carry3) are monitored, and control is performed appropriately to ensure that when one of the carry signals is 1, 0 is output from gate circuit 412, and that when the two carry signals are both 0, gate circuit 412 outputs the block size.

FIG. 3 is a schematic diagram illustrating the main portion of three-input total adder 420 made of partial adder 406 and partial adder 408. For bit 31 to bit 0 of each of the signals input to input terminals I1, I2, and I3, addition operation is performed, and carry signal (Carry2) is generated. In partial adder 408, addition operation is performed for the result of addition of partial adder 406 and the two carry signals (C1 and C2) output from addition/subtraction control circuits 400 and 401, respectively, generating the result of the total addition operation (bit 31 to bit 0) and the carry signal (Carry3).

In the following, an explanation will be given regarding the operation of address generating circuit 40 when the step value output to total adder 420 has a positive value, and circular addressing is performed in the direction from the top address to the bottom address. In this case, addition/subtraction control circuits 400 and 402, gate circuit 412, partial adders 406 and 408, adder 414, and carry checking circuit 410 correspond to index generating circuit 14 shown in FIG. 9.

In addition/subtraction control circuit 400, a positive step value is output to total adder 420. In this case, as MSB of the step value output to total adder 420 becomes 0, carry checking circuit 410 monitors the two carry signals output from total adder 420. Addition/subtraction control circuit 401 inverts the various bits of the input block size, and outputs the result to total adder 420, and, at the same time, it outputs the carry to total adder 420.

Total adder 420 performs the total addition operation for the step value, the index, and the signal obtained by inverting all of the bits of the block size, and the carry signal output from addition/subtraction control circuit 401, that is, it performs the subtraction operation for the sum of the index and step value and the block size. Total adder 420 performs processing step S110 shown in FIG. 10, and whether the result of subtraction of the sum of the index and step value and the block size is negative is determined.

Then, if the result of subtraction of the sum of the index and step value and the block size is negative, that is, if no carry signal is output from total adder 420, gate circuit 412 directly outputs the input block size to adder 414. Adder 414 performs the addition operation for signal ADD2 output from total adder 420 and the block size output from gate circuit 412, and outputs the addition signal of the index and the step value, that is, the value calculated by adding the step value to the value of bit N to bit 0 of the default address, to bit multiplexer 416. On the other hand, if the difference of the sum of the index and step value and the block size is 0 or positive, that is, if a carry signal is output from total adder 420, gate circuit 412 outputs 0 to adder 414. Adder 414 performs the addition operation of signal ADD2 output from total adder 420 and 0, the result of subtraction of the sum of the index and step value and the block size is calculated and is output to bit multiplexer 416.

In bit multiplexer 416, the value of bit 31 to bit (N+1) of the data output from bit isolating circuit 404, that is, the value of bit 31 to bit (N+1) of the default address, and the value of bit N to bit 0 of the new index output from adder 414 are combined, and the result is output as the new address.

By means of the aforementioned series of operations, address generation is realized in the circular addressing in the direction from the top address to the bottom address.

In the following, an explanation will be given regarding the operation of address generating circuit 40 in the case in which the step value output to total adder 420 is negative, and circular addressing is performed in the direction from the bottom address to the top address.

Addition/subtraction control circuit 400 outputs a negative step value to total adder 420. In this case, as MSB of the step value output to total adder circuit 420 is 1, carry checking circuit 410 monitors the two carry signals output from total adder 420. Also, addition/subtraction circuit 402 outputs data of 0 to total adder 420, and carry C2 is not output to total adder 420.

Total addition is performed for the step value, index, and 0 by total adder 420. As shown in FIG. 10, total adder 420 performs processing step S107, and whether the sum of the index and step value is negative is determined.

When the sum of the index and step value is negative, that is, when no carry signal is output from total adder 420, the block size input to gate circuit 412 is directly output to adder 414. Adder 414 performs the addition operation for signal ADD2 output from total adder 420 and the block size output from gate circuit 412, it calculates the sum of the index and the step value, and outputs the result to bit multiplexer 416. On the other hand, when the sum of the index and the step value is 0 or positive, that is, when the carry signal is output from total adder 420, gate circuit 412 outputs 0 to adder 414. Adder 414 performs the addition operation for signal ADD2 output from total adder 420 and 0, and it calculates the sum of the index and the step value, that is, the sum of the value of bit N to bit 0 of the default address and the step value, and outputs the result to bit multiplexer 416.

In bit multiplexer 416, the value of bit 31 to bit (N+1) of the data output from bit isolating circuit 404, that is, the value of bit 31 to bit (N+1) of the default address, and the value of bit N to bit 0 of the new index output from adder 414 are combined, and the result is output as the new address.

By means of the aforementioned series of operations, address generation is realized for the circular addressing in the direction from the bottom address to the top address.

In the following, an explanation will be given regarding address generating circuit 60 for circular addressing in this invention with reference to FIG. 4. There are 32 bits for each operation unit in this application embodiment.

Figure 4:
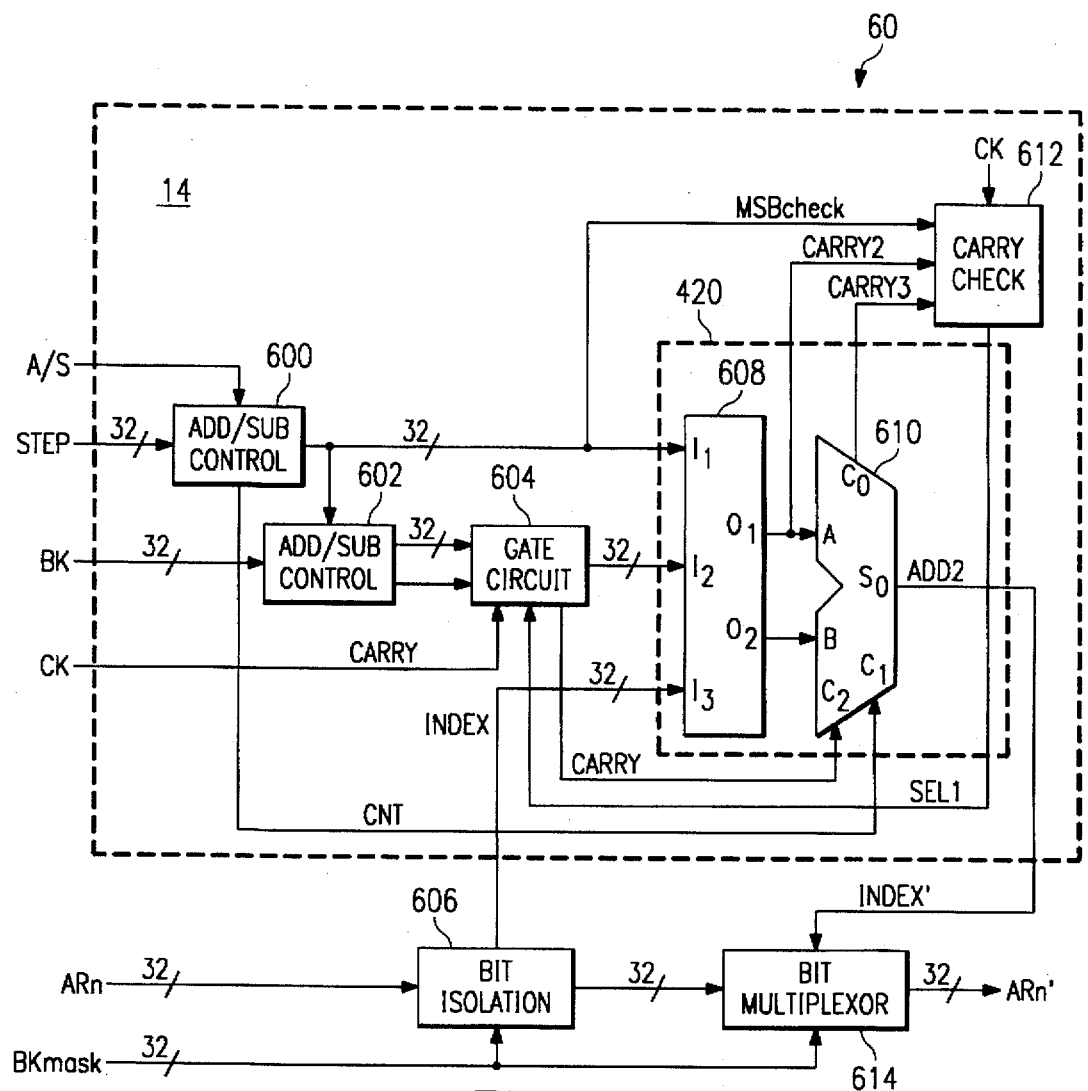
FIG. 4 is a diagram of an address generating circuit according to a third embodiment of this invention.
Figure 5:
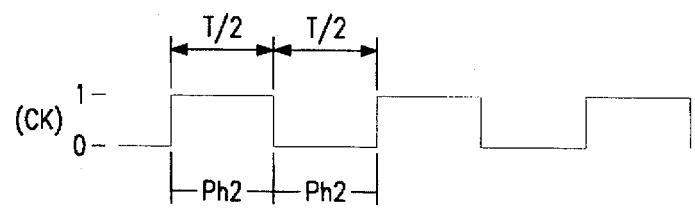
FIG. 5 is a timing diagram of a period of operation of address generating circuit of FIG. 4.

FIG. 4 is a diagram illustrating the configuration of address generating circuit 60 in the third application embodiment of this invention. Addition/subtraction control circuit 600 has the same function as that of addition/subtraction control circuit 300 in FIG. 1. According to addition/subtraction control signal (A/S), either the first operation mode or the second operation mode is adopted. In the first operation mode with the addition/subtraction control signal (A/S) of an addition command, the step value input to input terminal Step is directly output to input terminal I1 of partial adder 608. Also, in this case, no carry is output to input terminal C1 of partial adder 610. On the other hand, in the second operation mode with addition/subtraction control signal (A/S) of the subtraction command, the numerical value is calculated by inverting the various bits of the step value input to input terminal Step, and it is output to input terminal I1 of partial adder 608, and, at the same time, the carry is output to input terminal C1 of partial adder 610. Also, the step value is made of the signals output to input terminal I1 of partial adder 608 and input terminal C1 of partial adder 610.

Addition/subtraction control circuit 602 has the same function as that of addition/subtraction control circuit 306 shown in FIG. 1. According to the most significant bit (MSB) output to input terminal I1 of partial adder 608, either the first operation mode or the second operation mode is taken. When said MSB is 0 and the circular addressing is performed in the direction from the top address to the bottom address of the circular block, the second operation mode is adopted. In this case, the various bits of the block size input from input terminal BK are inverted, and the calculated numerical value is output to gate circuit 604, and, at the same time, the carry (Carry) is output to gate circuit 604. On the other hand, when said MSB is 1, and the circular addressing is performed in the direction from the bottom address to the top address, the first operation mode is adopted, and the block size input from input terminal BK is directly output to gate circuit 604. In this case, no carry is output to gate circuit 604.

In gate circuit 604, according to clock signal (CK) and control signal (SEL1) output from carry checking circuit 612, selection is made between the following options: the block size output from addition/subtraction control circuit 602 and carry signal 0 or the bit-inverted block size and carry signal 1 are directly output to input terminal I2 of partial adder 608 and input terminal C2 of partial adder 610; or data of 0 and carry signal 0 are output to input terminal I2 of partial adder 608 and input terminal C2 of partial adder 610.

As shown in FIG. 1, bit isolating circuit 606 has the same function as that of bit isolating circuit 304. Based on BKmask, the address input from input terminal ARn is divided into most significant bit side and least significant bit side, which are output to bit multiplexer 614 and input terminal I3 of partial adder 608.

Bit multiplexer 614 has the same function as that of bit multiplexer 314 shown in FIG. 1. Based on BKmask, multiplexing is performed for the most significant bit side of the data output from bit isolating circuit 606 and the least significant bit side of signal ADD2 output from partial adder 610, and the multiplexed data is output as the new address to output terminal ARn'.

The same data format as explained in FIG. 1 is adopted for BKmask, the data output to input terminal I3 of partial adder 608, the data output from bit isolating circuit 606 to bit multiplexer 614, the data output from partial adder 610, and the data output from bit multiplexer 614.

In addition, the data output to input terminal I3 of partial adder 608 is Index, and the data output from partial adder 610 is Index'.

Just as partial adder 406 and 408 shown in FIG. 2, partial adders 608 and 610 are also made of three-input total adder 420 shown in FIG. 3. For the values input to input terminals I1, I2, I3, C1, and C2, the total addition operation is performed, and the result of the total addition (signal ADD2) is output as new index (Index') to bit multiplexer 614, and two carry signals (Carry2, Carry3) are output to carry checking circuit 612.

Depending on the most significant bit (MSB) of the step value output to total adder 420, and the two carry signals output from total adder 420, carry checking circuit 612 divides clock signal (CK) to former half (ph1) and latter half (ph2), and gate circuit 604 is controlled by control signal (SEL1).

When said MSB is 1, that is, when the circular addressing is performed in the direction from the bottom address to the top address, the two carry signals are monitored. In the former half (ph1) of clock signal (CK), gate circuit 604 performs control appropriately to ensure that the data of 0 and the carry signal 0 are output to input terminal I2 of partial adder 608 and input terminal C2 of partial adder 610. In the latter half (ph2) of the clock signal, control is performed appropriately by gate circuit 604 to ensure that when a carry is output in the former half of the clock signal, that is, when one carry signal is 1, the data of 0 and the carry signal 0 are output to input terminal I2 of partial adder 608 and input terminal C2 of partial adder 610. In the former half of the clock signal, no carry is output. That is, when both carry signals are 0, gate circuit 604 performs control appropriately to ensure that the block size and carry signal 0 output from addition/subtraction control circuit 602 are output to input terminal I2 of partial adder 608 and input terminal C2 of partial adder 610.

On the other hand, when said MSB is 0, that is, when the circular addressing is performed in the direction from the top address to the bottom address, the two carry signals are monitored. In the former half (ph1) of the clock signal (CK), gate circuit 604 performs control appropriately to ensure that the bit-inverted block size and carry signal 1 output from addition/subtraction control circuit 602 are input to input terminal I2 of partial adder 608 and input terminal C2 of partial adder 610. In the latter half of the clock signal (ph2), when one of the carry signals is 1 in the former half of the clock signal, gate circuit 604 performs control appropriately to ensure that the bit-inverted block size and carry signal 1 output from addition/subtraction control circuit 602 are output to input terminal I2 of partial adder 608 and input terminal C2 of partial adder 610. When both carry signals in the former half of the clock signal are 0, gate circuit 604 performs control appropriately to ensure that the data of 0 and the carry signal 0 are output to input terminal I2 of partial adder 608 and input terminal C2 of partial adder 610.

In the following, an explanation will be given regarding the operation of address generating circuit 60 in the case in which the step value output to total adder 420 is positive, that is, when the circular addressing is performed in the direction from the top address to the bottom address. In this case, addition/subtraction control circuits 600 and 602, gate circuit 604, partial adders 608 and 610, and carry checking circuit 612 correspond to index generating circuit 14 shown in FIG. 9.

Addition/subtraction control circuit 600 outputs a positive step value to total adder 420. In this case, as MSB of the step value output to total adder 420 is 0, carry checking circuit 612 monitors the two carry signals output from total adder 420. In addition/subtraction control circuit 602, the various bits of the block size input are inverted, and the result is output to gate circuit 604, and, at the same time, carry signal 1 is output to gate circuit 604.

In the former half (ph1) of clock signal (CK), gate circuit 604 outputs bit-inverted block size and carry signal 1 output from addition/subtraction control circuit 602 to total adder 420.

In the former half (ph1) of clock signal (CK), total adder 420 performs the total addition operation for the step value, the index, the signal obtained by inverting the various bits of the block size, and carry signal 1 output from addition/ subtraction control circuit 602, that is, it performs the subtraction operation for the sum of the index and step value and the block size. Total adder 420 performs processing step S110 shown in FIG. 10, and whether the subtraction result of the sum of index and step value and the block size is negative is determined.

Consequently, in the former half of the clock signal, when the difference of the sum of the index and step value and the block size is negative, that is, when no carry signal is output from total adder 420, gate circuit 604 outputs data of 0 and carry signal 0 in total adder 420 in the latter half of the clock signal. In the latter half (ph2) of the clock signal, total adder 420 performs the total addition operation for the step and index, the signal obtained by adding the step value to the index, that is, the value obtained by adding the step value to the value of bit N to bit 0 of the default address, is calculated and output to bit multiplexer 614. On the other hand, when in the former half of the clock signal, the result of subtraction of the sum of the index and step value and the block size is 0 or positive, that is, when the carry signal is output from total adder 420, gate circuit 604 outputs the bit-inverted block size of carry signal 1 to total adder 420 in the latter half of the clock signal. Consequently, total adder 420 performs the total addition operation for the index, the step value, the signal obtained by inverting the various bits of the block size, and carry signal 1 output from addition/ subtraction control circuit 602, and it calculates the result of subtraction of the sum of the index and step value and the block size, and outputs the result to bit multiplexer 614.

In bit multiplexer 614, the value of bit 31 to bit (N+1) of the data output from bit isolating circuit 606, that is, the value of bit 31 to bit (N+1) of the default address, and the value of bit N to bit 0 of the new index output from total adder 420 are combined, and the result is output as the new address.

By means of the aforementioned series of operations, it is possible to realize address generation in the circular addressing in the direction from the top address to the bottom address.

In the following, an explanation will be given regarding the operation of address generating circuit 60 when the step value output to total adder 420 is negative, and when the circular addressing is performed in the direction from the bottom address to the top address.

Addition/subtraction control circuit 600 output the negative step value to total adder 420. In this case, as MSB of the data output to total adder 420 is 1, carry checking circuit 612 monitors the two carry signals output from total adder 420, and addition/subtraction control circuit 602 outputs the input block size in its original form to gate circuit 604. Also, in this case, the carry is not output to total adder 420). In the former half (ph1) of the clock signal, gate circuit 604 outputs data of 0 and carry signal 0 to total adder 420.

In the former half (ph1) of the clock signal, total adder 420 performs the total addition operation for the index and the step value. Total adder 420 performs the processing step S107 shown in FIG. 10, and whether the sum of the index and step value is negative is determined.

When the sum of the index and step value is negative in the former half of the clock signal, that is, when no carry signal is output from total adder 420, in the latter half (ph2) of the clock signal, gate circuit 604 outputs the block size and carry signal 0 to total adder 420. Consequently, in the latter half of the clock signal, total adder 420 performs the total addition operation for the index, the step value, and the block size, and it outputs the result of the operation to bit multiplexer 614. On the other hand, when in the former half of the clock signal, the sum of the index and the step value is 0 or positive, that is, when carry signal is output from total adder 420, in the latter half of the clock signal, gate circuit 604 outputs data of 0 and carry signal 0 to total adder 420. Consequently, in the latter half of the clock signal, total adder 420 performs the total addition operation for the index and the step value, and the signal of the addition of the index and step value, that is, the value obtained by adding the step value to the value of bit N to bit 0 of the default address, is calculated and output to bit multiplexer 614.

In bit multiplexer 614, the value of bit 31 to bit (N+1) of the data output from bit isolating circuit 606, that is, the value of bit 31 to bit (N+1) of the default address, and the value of bit N to bit 0 of the new index output from total adder 420 are combined, and the result is output as the new address.

By means of the aforementioned series of operations, it is possible to realize address generation in the circular addressing in the direction from the bottom address to the top address.

For the address generating circuit for circular addressing of this invention explained above, instead of deriving the next address by calculating the default address value directly, the next address is calculated indirectly using the index, step value, and block size. Consequently, the calculation can be performed with a high efficiency. In the first application embodiment, there are two adders, and the hardware is simplified. In addition, in the third application embodiment, the next address can be calculated in one clock cycle. Consequently, it is appropriate for high-speed application.

Also, for the address generating circuit of this invention, it is only necessary to store the step value and block size, while there is no need to store the top address and bottom address.

In the above, an explanation has been given for the address generating circuit for the circular addressing in this invention. Based on the technological idea in this invention shown in FIG. 10, various forms of the circuits can be adopted, and they are evident for those skilled in the art.

In the following, an explanation will be given regarding the address generating circuit for the block repeat addressing in this invention with reference to FIG. 6.

Figure 6:
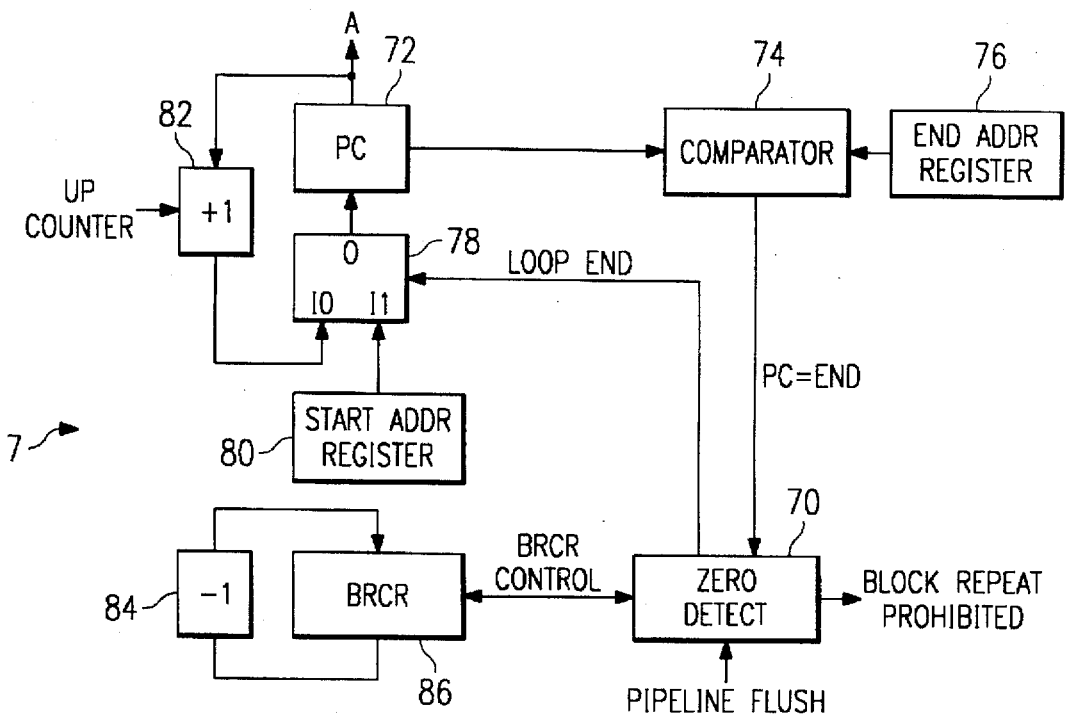
FIG. 6 is a diagram of an address generating circuit according to a fourth embodiment of this invention.

FIG. 6 is a diagram illustrating the configuration of address generating circuit 7 in the fourth application embodiment of this invention. Address generating circuit 7 consists of program counter (PC) 72, comparator 74, register (END) 76, selector 78, register (START) 80, up counter 82, down counter 84, register (BRCR) 86, and zero detecting circuit 70. Also, the method in this application embodiment may also be adopted in the case in which there are two stages for the delay in the pipeline.

Figure 11:
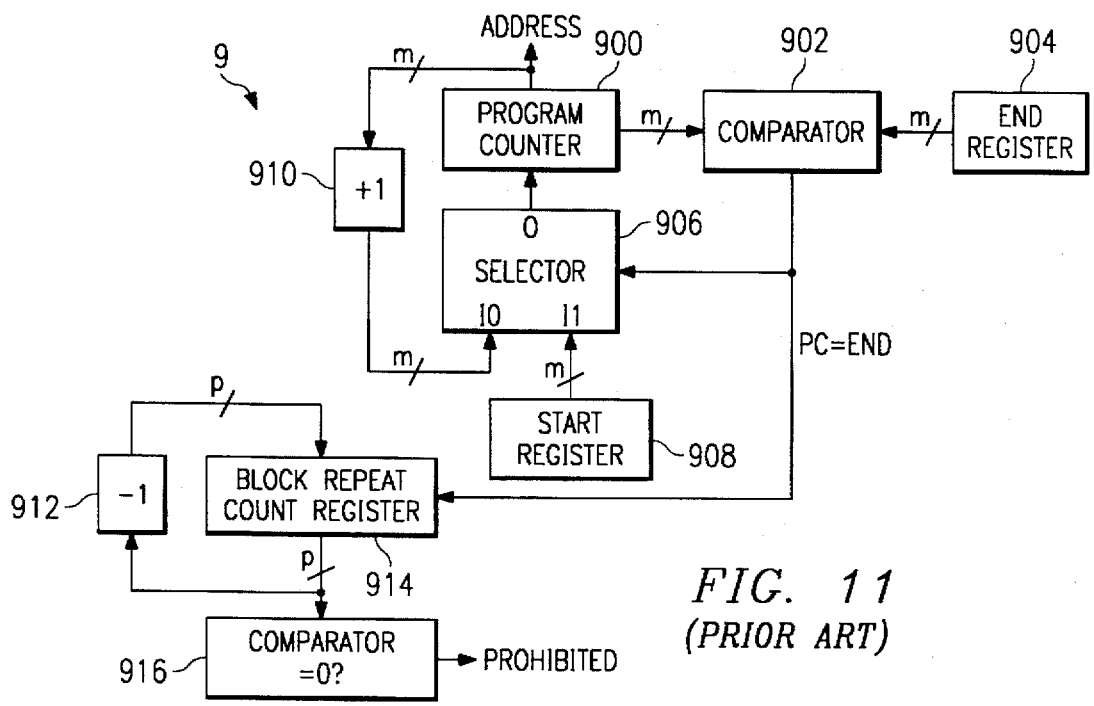
FIG. 11 is a diagram of a conventional address generating circuit for block repeat addressing.

Just as in the conventional circuit shown in FIG. 11, in this application embodiment, before implementation of the block repeat operation, the bottom address of the program for repeated execution in register 76 (the tail address) is set; in register 80, the top address (head address) of the aforementioned program is set; in register 86, the repetition number is set as an initial value.

Figure 7:
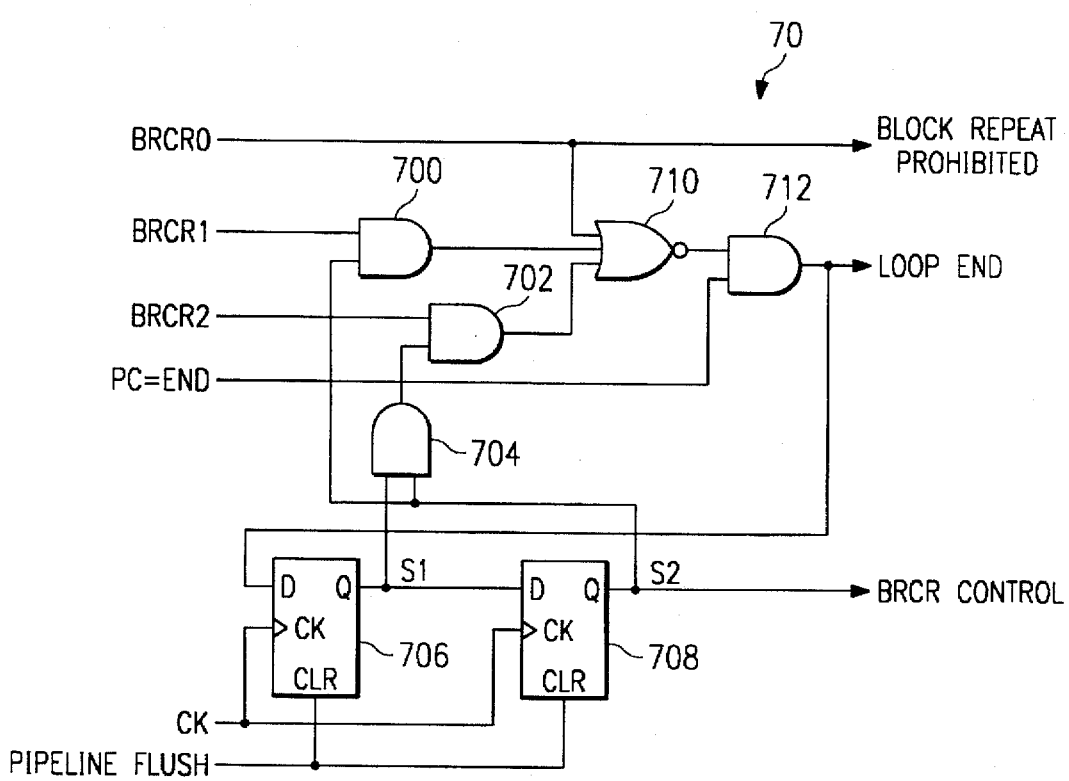
FIG. 7 is a diagram of a main portion of a zero-detecting circuit.

FIG. 7 is a diagram illustrating the configuration of the main portion of zero detecting circuit 70. Clock signal CK as the operation clock signal of the pipeline (CPU) is input to the clock terminals of flip-flop circuits 706 and 708, and the pipeline flush signal that indicates interruption is input to the clear terminal. Input terminal D of flip-flop circuit 706 is connected to the output terminal of AND circuit 712, and output terminal Q is connected to input terminal D of flip-flop circuit 708 and one input terminal of AND circuit 704. Output terminal Q of flip-flop circuit 708 is connected to one input terminal of AND circuit 700 and the other input terminal of AND 704. The other input terminal of AND circuit 700 receives signal BRCR1 as an input signal, and its output terminal is connected to the second input terminal of NOR circuit 710. One input terminal of AND circuit 702 receives signal BRCR2 as an input signal, and the other input terminal is connected to the output terminal of AND circuit 704, while the output terminal is connected to the third input terminal of NOR circuit 710. The first input terminal of NOR circuit 710 receives signal BRCR0 as an input signal, and its output terminal is connected to one input terminal of AND circuit 712. The other input terminal of AND circuit 712 receives PC=END signal as an input signal.

Signals BRCR2, BRCR1, and BRCR0 are generated by decoding the repetition number of output from register 86. These signals become high when the repetition number becomes 2, 1, and 0, respectively. Signal BRCR0 is directly output as block repeat inhibiting signal. Also, loop end signal is output from the output terminal of AND circuit 712, and BRCR control signal is output from output terminal Q of flip-flop circuit 708.

When the block repeat access is started, for each period of operation, an address is generated from program counter 72. This address is fed to a memory (not shown in the figure) and up counter 82, and, at the same time, it is output to comparator 74. Up counter 82 adds (increments) one to the input address, and the result is output to input terminal I0 of selector 78.

Comparator 74 compares the address output from program counter 72 and the bottom address stored in register 76, and their agreement is detected. When comparator 74 fails to detect agreement between the address of program counter 900 and the bottom address, PC=END signal becomes inactive (low level). On the other hand, when comparator 74 detects agreement between the address of program counter 72 and the bottom address, PC=END signal becomes active (high level).

Selector 78 is controlled by the loop end signal output from zero detecting circuit 70. When the loop end signal becomes inactive (low level), the input I0 side is selected, and output is made to program counter 72. That is, when the address in the period of operation and the bottom address are not in agreement with each other, the address of the period of operation is incremented, and the incremented address is output as the address for the next period of operation from program counter 72. On the other hand, when the loop end signal becomes active (high level), selector 78 selects the input I1 side, and outputs to program counter 72. That is, when the address reaches the bottom address, as the address in the next period of operation, the top address is output from program counter 72.

Corresponding to the BRCR control signal output from zero detecting circuit 70, register 86 subtracts (decrements) one from the repetition number by means of down counter 84, the decremented value is stored, and, at the same time, it is output to zero detecting circuit 70.

In the following, an explanation will be given regarding the operation of zero detecting circuit 70. When the repetition number is 3 or larger, one of BRCR2, BRCR1, and BRCR0 is at the low level. Consequently, the output of NOR circuit 710 becomes high. In this case, comparator 74 places PC=END signal in the active state (high level), and high-level loop end signal (active state) made of AND circuit 712 is output. The high-level loop end signal is input to flip-flop circuit 706. As flip-flop circuits 706 and 708 have output signals changed once a pulse is input, they act as a type of delay means. Consequently, with a delay of one clock signal CK period from the time when the loop end signal becomes high, node S1 becomes high, and, with a delay of two clock signal CK periods from the time when the loop end signal becomes high, node S2 becomes high. That is, BRCR control signal becomes active (high level) with a delay of two clock signal CK periods from the time when the loop end signal becomes high.

As explained above, BRCR control signal becomes active with a delay of two clock signal CK periods from the time when the loop end signal becomes high. Consequently, when delay of the pipeline is in two stages, after the bottom address command is executed, the content of register 86, that is, the repetition number, is decremented. Consequently, when PC=END signal becomes active and the command of the bottom address is fetched, interruption takes place, and the pipeline flush signal becomes active (high level); flip-flop circuits 706 and 708 are then cleared. For example, suppose the command of the bottom address is not executed while interruption processing is performed, the content of register 86, that is, the repetition number, is not decremented. Consequently, although the command of the bottom address is not executed, as the repetition number is not decremented, there is no need to set the interruption inhibition with respect to the command near the bottom address.

AND circuits 700, 702, 704 and 712 and NOR circuit 710 function as the loop end inhibiting circuit, which inhibits the loop end processing, that is, processing with top address input to program counter 72. In zero detecting circuit 70, as BRCR signal becomes active with a delay of two clock signal CK periods from the time of activation of the loop end signal, in some cases, when the block size is 2 or smaller, that is, when the difference between the top address and the bottom address is 1 or smaller, before the repetition number stored in register 86 is decremented, the activated next PC=END signal is output from comparator 74. Consequently, when the block size is 2 or smaller, and the repetition number is 2 or smaller, the loop end processing is performed before the repetition number is decremented. As a result, block repeat processings with a number larger than the repetition number are performed.

When the block size is 2 or smaller, and the repetition number is 2 or smaller, before register 86 is decremented based on activation of PC=END signal of the preceding cycle, that is, activation of signal BRCR, is performed, new loop end processing is prohibited. The block size can be identified by the combination of nodes S1 and S2 and the repetition number. Consequently, when the repetition number stored in register 86 is 2, the loop end processing is prohibited by the AND signal (output of AND circuit 702) of the AND signal high-level (output of AND circuit 704) of nodes S1 and S2 and the high-level signal indicating that the repetition number is 2 (signal BRCR2). When the repetition number stored in register 86 is 1, the loop end processing is prohibited by the AND signal (output of AND circuit 700) of the high-level signal of node S2 and the high-level signal (signal BRCR1) indicating that the repetition number is one. When the repetition number is 0, the loop end processing is prohibited by means of the signal indicating that the repetition number is 0 alone. Also, the high-level signal indicating that the repetition number is 0 is used as the block repeat prohibiting signal. Due to activation of this signal (high level), address generating circuit 9 ends the block repeat access operation.

Figure 8:
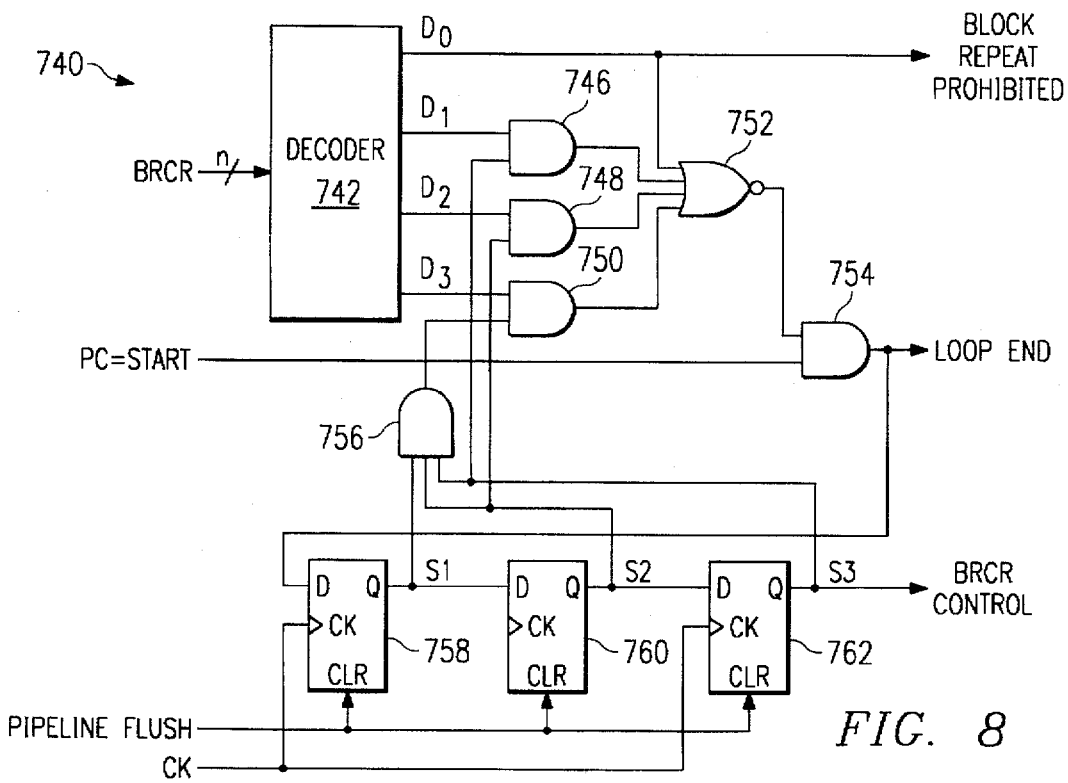
FIG. 8 is a diagram of a main portion of a modified embodiment of a zero detecting circuit.

FIG. 8 is a diagram illustrating the configuration of the element parts of a modified embodiment of detecting circuit 70.

Decoder 742 receives the repetition number (signal BRCR) output from register 86, and controls signals d0, d1, d2 and d3 corresponding to this value. Signal d0 becomes high when the repetition number is 0; signal d1 becomes high when the repetition number is 1; signal d2 becomes high when the repetition number is 2; and signal d3 becomes high when the repetition number is 3. Signal d0 is input to the first input terminal of NOR circuit 752, and it also acts as block repeat prohibiting signal. Signal d1 is input to one input terminal of AND circuit 746, signal d2 is input to one input terminal of AND circuit 748, and signal d3 is input to one input terminal of AND circuit 750.

Clock signal CK, the operation clock signal of pipeline (CPU), is input to the clock terminals of flip-flop circuits 758, 760, and 762, and pipeline flush signal indicating the interruption is input to the clear terminal. Input terminal D of flip-flop circuit 758 is connected to the output terminal of AND circuit 754, and output terminal Q is connected to input terminal D of flip-flop circuit 760 and the first terminal of AND circuit 756. Output terminal Q of flip-flop circuit 760 is connected to input terminal D of flip-flop circuit 762, second input terminal of AND circuit 756, and the other input terminal of AND circuit 748. Output terminal Q of flip-flop circuit 762 is connected to the third output terminal of AND circuit 756 and the other output terminal of AND circuit 746.

The output terminal of AND circuit 756 is connected to the other input terminal of AND circuit 750. The output terminals of AND circuits 746, 748, and 750 are connected to the second, third, and fourth input terminals of NOR circuit 752, respectively. The output of NOR circuit 752 is connected to one input terminal of AND circuit 754. PC=END signal is input to the other input terminal of AND circuit 754.

Here, the output signal of AND circuit 754 acts as the loop end processing signal, and output signal Q of flip-flop circuit 762 acts as BRCR control signal.

In the following, an explanation will be given regarding the operation of said zero detecting circuit 740. When the repetition number is 4 or larger, as the output of NOR circuit 752 becomes high, when PC=END signal becomes active (high level), the loop end signal becomes active (high level), and the loop end processing is executed. Also, with a delay of three clock signal CK periods from the loop end signal, the BRCR control signal becomes active (high level), and register 86 is decremented.

In zero detecting circuit 740, with a delay of three clock signal CK periods from activation of the loop end signal, the BRCR control signal is activated. Consequently, when the block size is 3 or smaller, that is, when the difference between the top address and the bottom address is 2 or smaller, before the repetition number stored in register 86 is decremented, the activated next PC=END signal may be input. Consequently, when the block size is 3 or smaller, and the repetition number is 3 or smaller the loop end processing is performed before the repetition number is decremented. As a result, more block repeat processing cycles than the repetition number are performed.

In zero detecting circuit 740, decoder 742, AND circuits 746, 748, 750, 754 and 756, and NOR circuit 752 form loop end processing prohibiting circuit. As explained above, it is possible to prevent trouble related to a large number of block repeat processing cycles.

The block size can identify the combination of the high level of nodes S1, S2, and S3, and the repetition number. Consequently, when the repetition number stored in register 86 is 3, the loop end processing is prohibited by means of the AND signal (the output of AND circuit 750) of the high-level AND signal (the output of AND output 756) of nodes S1, S2, and S3, and high-level signal d3 indicating that the repetition number is 3. Also, when the repetition number stored in register 86 is 2, the loop end processing is prohibited by means of the AND signal (output of AND circuit 748) of the high-level signal of node S2 and the high-level signal d2 indicating that the repetition number is 2. Also, when the repetition number stored in register 86 is 1, the loop end processing is prohibited by means of the AND signal (output of AND circuit 746) of the high-level signal of node S3 and the high-level signal d1 indicating that the repetition number is 1. In addition, when the repetition number is 0, the loop end processing is prohibited by high-level signal d0 indicating that the repetition number is 0, alone. Also, high-level signal d0, which indicates that the repetition number is 0, also acts as the block repeat prohibiting signal; and due to activation of this signal (high level), address generating circuit 9 completes the block repeat access operation.

By means of address generating circuit 7 of this invention, there is no limitation whatsoever on the block size in the block repeat addressing. Consequently, it is possible to reduce the time for executing a command repeatedly.

In the aforementioned application embodiment, the repetition number is input to zero detecting circuit 70 from register 86. However, it is also possible to adopt a configuration in which the repetition number is directly input to zero detecting circuit 70 from down counter 84.

Also, for addition and subtraction operations in up counter 82 and down counter 84, a numerical value other than one may be adopted.

For said address generating circuit 7, delay of the pipeline is performed in two or three stages. However, according to this invention, it is also possible to adopt four stages or more for delay of the pipeline by making appropriate change for the zero detecting circuit.

As explained above, according to this invention, in the address generating circuit for circular addressing, generation of the address (pointer) can be simplified, and the hardware for the comparison processing can also be simplified.

Also, in the address generating circuit for block repeat addressing, it is possible to lift the restriction on the block size due to the number of stages of delay of the pipeline, and the restriction on generation of the program.

Although the invention has been described with reference to embodiments, this description is not be construed in a limiting sense. Various modifications of the disclosed embodiments will become apparent to persons skilled in the art upon reference to this description. It is contemplated that the appended claims will cover any such modifications or embodiments as fall within the true scope of the invention.

We claim:

1. An address generating circuit for generating a successive address from a default address separated by a prescribed step value within a memory region having a prescribed block size of addresses, comprising:

a bit isolation circuit for separating a least significant bit portion of the default address from a most significant bit portion of the default address responsive to the block size;

an index generating circuit for forming an index, the index generating circuit operable to form a first difference equal to the sum of the least significant bit portion and the step value minus the block size when the step value is positive, and further operable to output the first difference as the index when the difference is ≧0;

the index generating circuit further operable to form a first sum equal to the least significant bit portion plus the step value when the step value is negative, and further operable to output the first sum as the index when the first sum is ≧0; and a bit multiplexing circuit for generating the successive address from the index and the most significant bit portion of the default address.

2. The circuit of claim 1 wherein the index generating circuit is further operable to output the first sum of the least significant bit portion and the step value as the index when the first difference formed by the index generating circuit is <0.

3. The circuit of claim 1 wherein the index generating circuit is further operable to output a second sum of the least significant bit portion, the step value, and the block size as the index when the first sum formed by the index generating circuit is <0.

4. An address generating circuit for generating a successive address from a default address separated by a prescribed step value within a memory region having a prescribed block size of addresses, comprising:

a bit isolation circuit for separating a least significant bit portion of the default address from a most significant bit portion of the default address responsive to the block size;

an index generating circuit for forming an index, the index generating circuit operable to form a first difference equal to the sum of the least significant bit portion and the step value minus the block size when the step value is positive, and further operable to output the first difference as the index when the difference is ≧0, and further operable to output a first sum of the least significant bit portion and the step value as the index when the first difference formed by the index generating circuit is <0;

the index generating circuit further operable to form a second sum equal to the least significant bit portion plus the step value when the step value is negative, and further operable to output the second sum as the index when the second sum is ≧0, and further operable to output a sum of the least significant bit portion, the step value, and the block size as the index when the second sum formed by the index generating circuit is <0; and a bit multiplexing circuit for forming the successive address from the index and the most significant bit portion of the default address.

5. The circuit of claim 4, wherein the bit multiplexing circuit is further operable to form the successive address by concatenating the most significant bit portion of the default address with the index, wherein the index forms a least significant portion of the successive address and the most significant bit portion of the default address forms a most significant portion of the successive address.

6. The circuit of claim 5, wherein the index generating circuit further comprises:

a first control circuit operable to form an output step value, wherein the output step value is the step value when a control signal indicates the step value is positive, and the output step value is a one's compliment of the step value when the control signal indicates the step value is negative;

a gate circuit with a select signal connected to a control input, a clock signal connected to a clock input, the gate circuit operable to form a first gated block size during a first phase of the clock signal and a second gated block size during a second phase of the clock signal, wherein the first gated block size is a one's compliment of the block size or 0 in response to a signal from the first control circuit, and wherein the second gated block size is the block size or 0 in response to the select signal; and a three input total adder circuit operable to form the index on an output, wherein the index is a sum of the output step value on a first input, the gated block size on a second input, and the least significant bit portion of the default address on a third input.

7. The circuit of claim 5, wherein the index generating circuit further comprises:

a first control circuit operable to form an output step value, wherein the output step value is the step value when a control signal indicates the step value is positive, and the output step value is a one's compliment of the step value when the control signal indicates the step value is negative; and a second control circuit operable to form an output block size value, wherein the output block size value is a one's compliment of the block size or 0 in response to a signal from the first control circuit.

8. The circuit of claim 7, wherein the index generating circuit further comprises a three input total adder circuit operable to form a first output sum on an output, wherein the first output sum is a sum of the output step value on a first input, the block size on a second input, and the least significant bit portion of the default address on a third input.

9. The circuit of claim 8, wherein the index generating circuit further comprises:

a gate circuit with a select signal connected to a control input and the block size connected to another input, the gate circuit operable to form a gated block size, wherein the gated block size is the block size or 0 in response to the select signal; and a two input adder operable to form the index value on an output of the two input adder, wherein the index value is a sum of the first output sum and the gated block size.

\* \* \* \* \*